3,037,954
PROCESS FOR PREPARING A VULCANIZED BLEND OF CRYSTALLINE POLYPROPYLENE AND CHLORINATED BUTYL RUBBER
Albert M. Gessler, Cranford, and William H. Haslett, Jr., Roselle, N.J., assignors to Esso Research and Engineering Company, a corporation of Delaware
No Drawing. Filed Dec. 15, 1958, Ser. No. 780,240
2 Claims. (Cl. 260—29.8)

This invention relates to polypropylene blends and more particularly to vulcanized blends of polypropylene and rubbery polymers.

Prior to the present invention, it was known that polypropylene could be cured by curing agents such as sulfur and a mixture of paraquinone dioxime and benzothiazyl disulfide. It was also known that blends of polyethylene and butyl rubber could be cured with a combination of a bi-functional aromatic compound having two nitrogen-containing groups and a free radical catalyst such as a peroxide catalyst. Recent attempts were made to substitute polypropylene for polyethylene in the above blend but attempts to cure this blend were unsuccessful since polypropylene decomposed rapidly at curing temperatures under the influence of the peroxide catalyst.

It has now surprisingly been found that blends of polypropylene and vulcanizable rubbery polymers can be cured with curing agents that do not contain peroxides to vulcanizates having tensile strength properties superior to both of the components of the blend.

From about 50 to 95 parts of polypropylene and from about 5 to 50 parts of vulcanizable rubbery polymer are used to form the vulcanized blends of the invention.

The polypropylene used as a component of the novel vulcanized blends of the invention is the so-called "low-pressure" polypropylene, i.e. polypropylene prepared by the polymerization of propylene in an inert diluent with catalyst systems made up of reducible transition metal compounds and reducing metal containing compounds under relatively mild conditions of temperature and pressure. The general process for polymerizing alpha olefins using such catalyst systems is well-known to the art; see Belgian Patent 533,362, 538,782, "Chemical and Engineering News," April 8, 1957, pages 12 through 16, and "Petroleum Refiner," December 1956, pages 191 through 196. The preparation of low-pressure polypropylene is not within the scope of this invention and good descriptions of processes for its preparation can be found in copending applications Serial Nos. 578,198, filed April 16, 1956, to Tornqvist et al., and 667,277, filed June 21, 1957, to Langer et al.

The polypropylene preferred for use in the invention has a crystallinity above 20%, a viscosity average molecular weight using the Harris correlation in the range of from 40,000 to 500,000, a tensile strength of from 1,000 to 6,000 p.s.i., a softening point above about 140° C., an apparent modulus of elasticity at 25° C. of from 20,000 to 160,000 and an intrinsic viscosity in tetralin at 125° C. at a concentration of 1 g. per liter of 1.0 to 6.0

The vulcanizable rubbery polymers useful as the other polymer component of the vulcanized blends of the invention are those rubbery vulcanizable polymers commonly known to the art for use as rubbers, such as butyl rubber, chlorinated butyl rubber, natural rubber, GR-S, neoprene, butadiene acrylonitrile copolymers, polybutadiene, and polyisobutene. Methods for their preparation are well known to the art and are not within the scope of this invention. Chlorinated butyl rubber is a chlorinated copolymer of isobutylene with a conjugated diolefin such as isoprene, butadiene, dimethyl butadiene, piperylene, etc. which contains from about 0.1 to 10 wt. percent, preferably about 0.5 to 3.0 wt. percent chlorine therein. The copolymer of isobutylene and isoprene is preferred. The preparation and uses of butyl rubbers are described in U.S. Patent 2,356,128 to Thomas et al. and a process for their chlorination is disclosed in copending application Serial No. 512,182, filed May 31, 1955, to Baldwin et al., now Patent No. 2,944,578. GR-S is a copolymer of about 75 wt. percent butadiene and 25 wt. percent styrene. Neoprene is a homopolymer of 2-chlorobutadiene.

The process of the invention is carried out by mixing polypropylene and one or more rubbery vulcanizable polymers with a curing agent in a rubber mill and heating the resulting mixture in a standard rubber press in the range of from 225° F. to 350° F., preferably 280° F to 315° F. until curing is effected. Fillers, rubber accelerators and antioxidants are added with the curing agent as desired. The mixing step can also be carried out in other rubber compounding equipment such as Banbury mixers and kneaders. In place of a rubber press, other conventional rubber curing equipment can be employed. The above technique is known as "static curing."

Alternatively, and preferably, dynamic curing can be used. Dynamic curing is carried out by milling the ingredients at the above curing temperatures in equipment which provides for adequate mixing at these temperatures such as heated two roll mills, internal mixers such as kneaders and Banbury mixers and homogenizing extruders. The milling is carried out for from 2 to 60 minutes, preferably 5 to 20 minutes depending on the temperature and the quantity and type of curing agent used. Dynamic curing is a new process which initially forms cross-linked or three dimensional polymer structures as with static curing. However, thereafter these structures are broken down and dispersed in the uncrosslinked matrix polymer as a micro gel. Thus, a thermoplastic rather than a thermosetting product is obtained with the result that there are no wasted polymer ingredients as frequently results with the static curing technique. Hence, dynamic curing provides a method for obtaining a vulcanizate in a thermoplastic material.

The curing agents used for curing the blends of the invention are curing agents commonly used and known to the rubber art with the exception of the peroxide catalysts which cannot be used successfully since they degrade polypropylene at curing temperatures. Curing agents particularly useful for curing the novel blends of the invention are sulfur, metal oxides, metal salts, metal powders, amines, quinone dioxime and its derivatives, p-dinitroso benzene and its derivatives, resins, and the like. In general, the metal components of the metal salts, metal oxides and metal powders are chosen from group IIA and IIB of the periodic table and copper and iron. Particularly useful are the metal oxides, sulfides, nitrates, phosphates, sulfates and organic acid salts of zinc, cadmium, manganese, iron and lead. The amines which are useful as curing agents herein are diamine, triamine and higher polyamines having one or more of the following types of amino groups; (a) unsubstituted amino groups, (b) monosubstituted amino groups; (c) disubstituted amino groups, and (d) heterocyclic amines such as pyridine. The substituents on the mono- and di-substituted amino groups are one or more alkyl, aryl and heterocyclic groups. The resins useful as curing agents are resins such as dimethylol phenol resins and halogenated dimethylol phenol resins. Mixtures of the above curing agents in any proportions relative to each other can also be used, as for example a sulfur-zinc oxide mixture. In general, from 0.1 to 10.0, preferably 1 to 5 parts by weight of curing agent or curing agent mixture is used per 100 parts by weight of polypropylene and vulcanizable rubbery polymer combined. It should be noted that unless otherwise indicated, parts of an ingredient given herein are parts by weight based on 100 parts by weight of polypropylene and vulcanizable rubbery polymer combined.

Fillers such as carbon blacks, silica, mica and others of like nature can be added to the curing mixtures in amounts of from 5 to 150 parts, preferably about 20 parts. Any type of carbon black can be used, such as channel blacks, furnace blacks, thermal blacks, acetylene blacks, lamp blacks, and the like. The amount of carbon black employed will depend somewhat on the particular vulcanizable rubbery polymers used in the blends, and optimum amounts can easily be determined by routine experimentation.

A small quantity, i.e. from 0.01 to 8 parts by weight, preferably from 0.5 to 3 parts by weight of a conventional rubber accelerator, for example tetramethylthiuram disulfide, benzothiazyl disulfide, 2-mercaptobenzothiazole, N-cyclohexylbenzothiazole-2-sulfenamide, selenium diethyl dithiocarbamate disulfide, and zinc butylxanthate can also be added with the filler. Mixtures of rubber accelerators can also be used. Additionally, antioxidants can be added when desired, such as for example secondary aromatic amines and phenols, e.g., phenyl-beta-naphthylamine, N,N' - di - beta - naphthyl-p-phenylenediamines, aldol-alpha-naphthylamine, 2,2,4-trimethyl-1,2-dihydroquinoline, hydroquinone monobenzyl ether, and 2,2'-methylene-bis(4-methyl-6-tert. butylphenol). From 0.01 to 10 parts by weight, preferably 0.1 to 2 parts by weight of antioxidant can be used. However, when quinone dioxime or its derivatives are used as the curing agent, it is advantageous to include from 5 to 15 parts of an oxidizing agent such as red lead in the curing mixture rather than an antioxidant.

Oils derived from coal tar, pine tar and/or petroleum can be added to the curing mixture if desired to serve as inexpensive fillers, softening agents or tackifying agents. From 2 to 30 parts, preferably 5 to 15 parts of oil can can be employed.

The vulcanizates of the invention have execellent mechanical and dynamic properties. They are useful wherever a high tensile strength semi-rigid plastic is required, such as for extruded items such as pipes and wire coatings, and in injection molded items such as plastic bottles and houseware items.

The invention will be understood more clearly from the following examples.

EXAMPLE I

A mixture was prepared from (a) 20 parts by weight of a chlorinated butyl rubber having 96.85% isobutylene, 1.97% isoprene and 1.18% chlorine and a molecular weight of 380,000 and (b) 80 parts by weight of polypropylene prepared by the polymerization of propylene in xylene diluent at 170° F. using $TiCl_3/AlCl_3/Al(C_2H_5)_3$ as a catalyst. Additional ingredients including a curing agent then were added in the quantities shown in Table I to different portions (A through E) of the above mixture. Each curing mixture was then divided into two parts and one part cured by first mixing the ingredients in a rubber mill followed by heating the ingredients in a rubber press to 320° F. for 20 minutes. The other part was dynamically cured by milling the mixture for 20 minutes at 320° F. The tensile strength, elongation, brittleness temperature, and modulus of elasticity of these cured mixtures are also given in Table I. The properties of polypropylene with and without carbon black (F and G) and the properties of chlorinated butyl rubber with carbon black (H) treated under the same curing conditions as for the above mixtures are given in Table I for comparision purposes.

*Table I*

| Ingredients, parts by wt. | Static Cure | | | | | Dynamic Cure | | | | | | | |
|---|---|---|---|---|---|---|---|---|---|---|---|---|---|
| | A | B | C | D | E | A | B | C | D | E | F | G | H |
| Polypropylene | 80 | 80 | 80 | 80 | 80 | 80 | 80 | 80 | 80 | 80 | 100 | 100 | 0 |
| Chlorinated butyl rubber | 20 | 20 | 20 | 20 | 20 | 20 | 20 | 20 | 20 | 20 | 0 | 0 | 100 |
| 4,4'-thiobis(3-methyl-6-tertiarybutylphenol) | 0.1 | 0.1 | 0.1 | 0.1 | 0.1 | 0.1 | 0.1 | 0.1 | 0.1 | 0.1 | 0.1 | 0.1 | 0.1 |
| M.P.C. Black | 0 | 10 | 20 | 30 | 50 | 0 | 10 | 20 | 30 | 50 | 50 | 0 | 50 |
| Zinc Oxide | 5 | 5 | 5 | 5 | 5 | 5 | 5 | 5 | 5 | 5 | 0 | 0 | 5 |
| Vulcanized Blend: | | | | | | | | | | | | | |
| Tensile strength, lbs./In.² | 2,970 | 3,020 | 3,560 | 2,670 | 2,050 | 2,820 | 4,090 | 4,490 | 4,200 | 3,180 | 4,240 | 3,320 | 2,730 |
| Elongtion, percent | 94 | 63 | 81 | 41 | 27 | 140 | 130 | 65 | 50 | 48 | 23 | 80 | 450 |
| Brittleness temp., ° F | −10 | +35 | +40 | >+70 | >+70 | +5 | +20 | +25 | +45 | +65 | >+70 | +30 | |
| Modulus of elasticity, Lbs./In.² × 10⁻⁵ | 0.30 | 0.30 | 0.30 | 0.42 | 0.43 | 0.31 | 0.32 | 0.33 | 0.46 | 0.43 | 0.80 | 0.50 | 1,690 |

As can be seen from Table I, the vulcanizates of the invention have very high tensile strengths; as high as 4490 lbs. with 20 parts of carbon black in the dynamically cured blend which is higher than that of either polymer ingredient. It is interesting to note that the addition of more carbon black to the curing mixtures resulted in decreased tensile strength and at 50 parts of carbon black (E), the tensile strengths of the vulcanized blends are about the same as for mixtures A which were cured without any carbon black. Additionally, the brittleness temperatures and elongations of the vulcanizates of the invention are about as good as that of the pure polypropylene starting material. Hence, the advantages in tensile strength and cost from the use of carbon black in the vulcanized blends of the invention are realized without sacrificing either brittleness temperature or elongation compared to polypropylene alone.

Modifications in the process of the invention and in the composition of the vulcanizates of the invention can be made by those skilled in the art without departing from the spirit and scope of the invention.

What is claimed is:

1. The process for preparing a novel vulcanized polymer blend comprising the steps of forming a mixture comprising from 50 to 95 parts of crystalline polypropylene, from 5 to 50 parts of a vulcanizable rubbery polymer which is a chlorinated copolymer of a major proportion of isobutylene and a minor proportion of isoprene, and from 0.1 to 10 parts of a curing agent selected from the group consisting of sulfur, metal oxides, metal powders, amines, quinone dioxime and its derivatives, p-dinitroso benzene and its derivatives, and resins, selected from the group consisting of dimethylol phenol resins and halogenated dimethylol phenol resins, and heating said mixture at a temperature of 225° to 350° F. under dynamic curing conditions of thorough mixing of from 5 to 20 minutes to produce a thermoplastic vulcanized polymer blend.

2. The process of claim 1 wherein the curing agents are employed with at least one of (a) inert fillers, (b) curing accelerators, (c) antioxidants, and (d) oils selected from the group consisting of coal tar oils, pine tar oils, petroleum oils and mixtures thereof.

References Cited in the file of this patent

UNITED STATES PATENTS

| | | |
|---|---|---|
| 2,296,854 | Kemp | Sept. 29, 1942 |
| 2,369,471 | Latham | Feb. 13, 1945 |
| 2,824,089 | Peters et al. | Feb. 18, 1958 |
| 2,927,904 | Cooper | Mar. 8, 1960 |
| 2,939,860 | Schramm | June 7, 1960 |

FOREIGN PATENTS

| | | |
|---|---|---|
| 538,782 | Belgium | Dec. 6, 1955 |

OTHER REFERENCES

"Wraps off Polypropylene," Chemistry and Eng. News, June 18, 1956, page 2980.